United States Patent Office 3,145,733
Patented Aug. 25, 1964

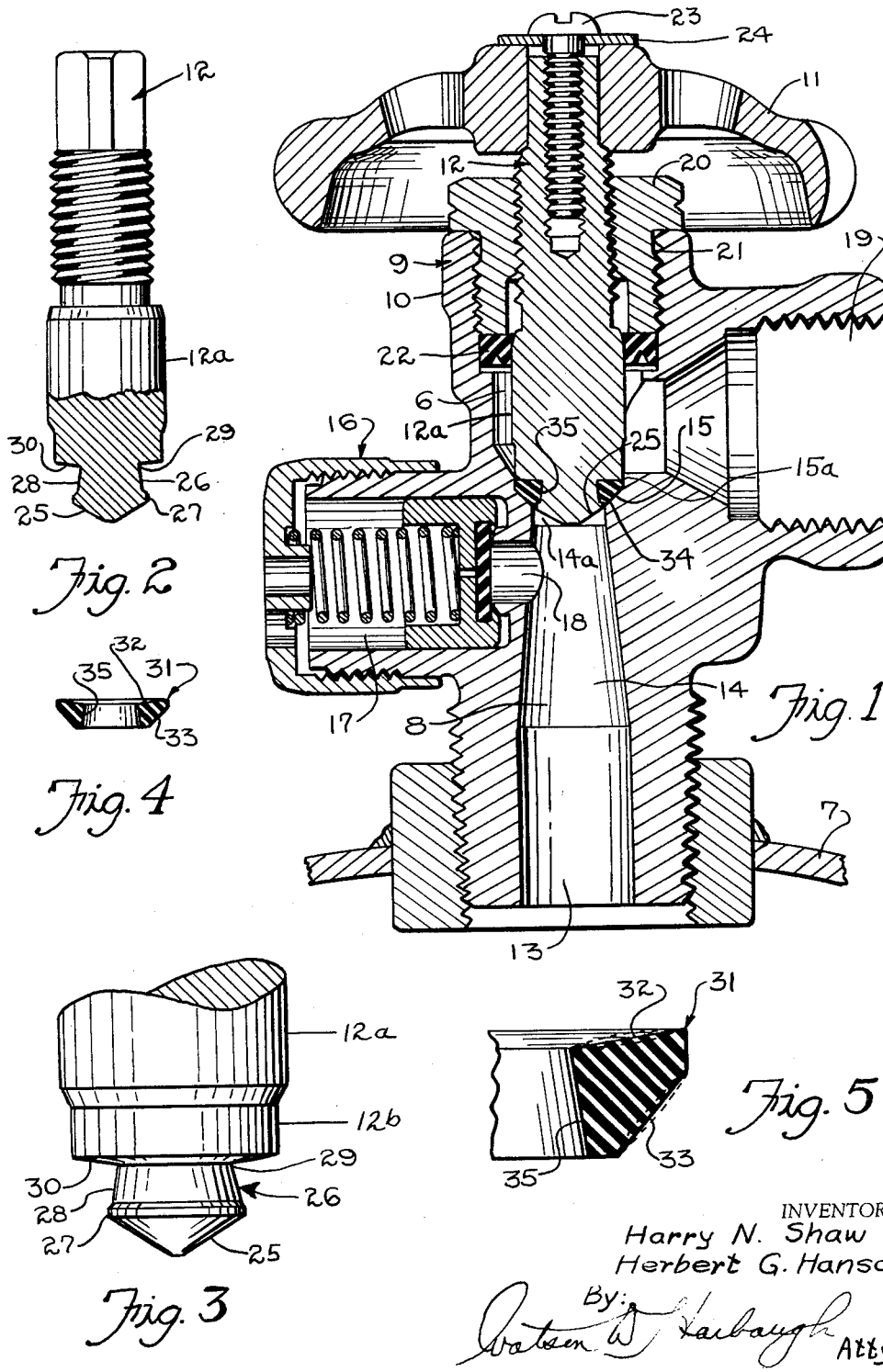

3,145,733
SWIVEL RING VALVE
Harry N. Shaw, Lake Forest, and Herbert G. Hanson, Chicago, Ill., assignors to The Bastian-Blessing Company, Chicago, Ill., a corporation of Illinois
Filed July 7, 1960, Ser. No. 41,332
5 Claims. (Cl. 137—583)

This invention relates to a control or shut-off valve, and more specifically to a valve having a plastic swivel ring for sealing off a fluid under pressure between a movable valve member and a valve seat.

Control valves or shut-off valves of the prior art have been customarily made to provide a ring or groove in a movable valve stem to retain an elastomer sealing member. The valve stem is generally used to engage or "go solid" against a metallic portion of the valve with the sealing member engaging a seat or cooperating portion for sealing off fluid flow between an inlet and a discharge port. The commonly used elastomer sealing member, well known in the art as an "O-ring," is resilient in nature and readily deforms upon coming in contact with a mating rigid surface. Before reaching a metal-to-metal contact there is substantial movement between the movable valve stem and the seat portion of the valve in which the O-ring is subjected to fluid flows, friction and squeezing that deform it extensively and not only creates a great deal of leakage troubles due to the wearing of the O-ring, but also provides difficulty in machining a proper contour and maintaining alignment of parts for the mating surfaces. Improperly contoured or aligned mating surfaces are often the cause for the frequent severing or cutting of the resilient O-ring member.

Metal-to-metal sealing members involve wear and excellent mating contours which became damaged with solid particles and leak.

In this connection another frequent cause of leakage in prior valves utilizing a resilient deformable sealing member is the embedding of foreign particles or contamination of the fluid into the sealing member. Since the resilient or deformable sealing members of these valves are held in fixed relationship with the movable valve member, the embedded foreign particle will form a groove or scratch the metal surface of the cooperating seat portion of the valve as the valve is continually operated. As is readily understood, this groove or scratched surface will eventually allow the fluid under pressure to leak past the sealing member.

It is also quite common in valves of the prior art to require a skilled person to replace the sealing members. The resilient sealing members are of such design that in many instances special tools and care are required to properly assemble the valve.

Heretofore, it has been necessary to use special or individual sealing means for each type of fluid being handled. Today, throughout industrial plants, it is necessary to have valving for all types of conditions and for handling all types of materials. It is quite obvious that it is necessary to provide valves and systems which will have an increased longevity and which are capable of being used in several different types of installations as where different metals may be used for different fluids.

It is therefore, the primary object of this invention to eliminate the problems set forth relating to the prior art and to provide an improved and useful sealing member for a control valve.

It is a specific object of this invention to provide an improved sealing member which is swivelly retained on a rotatable valve stem so that it may closed and open with a rectilinear movement within a control valve body.

Another object of this invention is to provide an improved flexible plastic sealing member of such a design that it is free to swivel directly upon and with respect to a rotatable valve stem when the valve is in either an open or closed position and in which the valve stem sealing member is dependent only upon two confining diameters for its full effectiveness and is independent of small axial tolerances and movement involved with the movement of stem in the valve bonnet.

Another object of this invention is to provide a valve having an improved sealing member which can be readily snapped into a correct and self adjusting position so that both the seat and the sealing member or ring are not subject to wear due to rubbing at the point of contact.

A still further object of this invention is to provide a valve having an improved swivel sealing member which has a contoured surface for a frictional binding contact with a mating tapered surface of the valve seat and a valve seat backed by heavy sections of the valve body to prevent distortions.

A further object of this invention is to provide a valve having an improved plastic sealing member which swivels about a valve stem member so that a different sealing surface is generally presented each time to the mating sealing surface of the valve seat when the valve is placed in a closed position.

A further object is to provide an improved valve stem, seal and seat arrangement affording full length engagement between the threads of the bonnet and stem without distortion and binding of the end threads which preferably may be fine double threads to establish the most workable proportions for lift, thrust and strength.

A still further object of this invention is to provide a valve having an improved plastic swivel sealing member which can deform to a limited extent under pressure for sealing purposes and returns to its original shape upon release of the pressure, particularly abusive pressures of excessive torque.

A still further object of this invention is to provide a valve having an improved plastic sealing member which is forced into a sealing orientation with a valve seat member by the combined action of a rotatable valve stem and the fluid pressure which is to be sealed and when opened the inlet to the valve is large, tapered and smooth to permit a rapid flow of very low turbulence with a venturi effect between the cooperating valve closure elements and the surface of the valve stem member beyond the dimension of the seal member.

A further object of this invention is to provide an improved swivel ring valve having a contoured groove formed on a movable stem for retaining a swivel sealing ring whereby the contour of the groove is such to prevent flow of the seal if excessive thrust is applied to the stem to place the valve in a closed position.

Another object of this invention is to provide an improved swivel ring valve construction which utilizes seal rings made of different plastic materials of similar physical characteristics, but selected for their chemical characteristics with respect to the medium to be controlled by the valve.

Another object of this invention is to provide a valve having an improved plastic sealing member which is durable in structure, easily assembly in a valve, economically produced, and so designed to freely swivel about a valve stem to assure a continuous positive seal when the valve is in the closed position and gives a snug tightening feeling to those using the valve by hand.

With the foregoing and other objects in mind, the invention resides in the following specification and appended claims, certain embodiments of which are illustrated in the accompanying drawings, in which:

FIG. 1 is a cross-sectional view of the valve embodying this invention;

FIG. 2 is a partial cross-sectional view of the valve stem of this invention;

FIG. 3 is a fragmentary view of the retaining groove of this invention;

FIG. 4 is a cross-sectional view of the sealing member of this invention; and

FIG. 5 is a fragmentary sectional view of the sealing member of this invention with optional surface contours illustrated by dash lines.

Referring to the drawings, a valve 9, illustrated in FIG. 1, includes a body or housing 10 with a passageway 8 therethrough, a handle 11, and a movable stem member 12 operated by the handle. The housing 10 may be of any suitable material, depending largely upon the fluid the valve will be used with and can be suitably formed by forging, casting and machining.

Referring now specifically to FIGS. 1 and 2, the housing 10 of the valve 9 provides an externally threaded inlet port 13 which may be suitably connected to an outlet connection of the pressure to be controlled as threaded into the top of a liquefied gas container 7. The inlet port 13 connects to a venturi passageway 14 which tapers to throat 14a that ends in a valve seat 15 beyond which it enlarges to a valve chamber 6 as will be explained later. The inlet port 13 to the valve is large, tapered and smooth to permit a rapid flow of the fluid, the design being such that there are no protruding shoulders or abrupt constrictions to increase the turbulence of the fluid.

A spring-actuated relief valve 16 is mounted in an externally threaded aperture 17 which is an integral part of the housing 10. An inlet passage 18 to the relief valve 16 is connected to the inlet port 13 of the valve 9 at a point on the venturi throat 14 just below the valve seat 15. The structure of the relief valve 16 and its adjustment may be of any suitable relief means and is not a part of this invention.

A discharge port 19 leads from the valve chamber 6 and preferably is positioned at right angles to the inlet port 13. It is formed by an internally threaded aperture which is an integral boss of the housing 10. The discharge port 19, as it extends inwardly of the housing 10, reduces in diameter terminating with the smallest diameter adjacent to the valve seat 15 in form to provide a POL connection.

The valve stem member 12 is mounted in the housing 10 at a point diametrically opposite the inlet port 13 and at right angles to the discharge port 19 by being threaded through a sealing plug or bonnet member 20 which is in turn threadably engaged in an internally threaded boss 21 integral with the housing 10. A pressure sealing ring 22 is positioned below the sealing plug 20 to provide a pressure seal between the housing 10, the pressure sealing plug 20 and a cylindrical surface 12a on the valve stem 12. The sealing ring may be any known commercial packing ring and is illustrated in the drawing as a resilient V-shaped or chevron ring 22.

The handle member 11 is removably secured to the upper portion of the valve stem 12 by a lock screw 23 and a retaining washer 24.

Referring now more specifically to FIG. 1, the valve stem 12 passes downwardly through the bonnet assembly 20 and terminates when in the closed position, within the throat 14a. The lower end of the valve stem 12 has an annular groove 26. Immediately below the groove 26 the stem 12 ends in a conical shaped bead portion 25. This conical shaped portion of the stem 12 has a threefold purpose. First, it acts as an efficient deflector in directing the passing of the fluid when the valve is open; second, it acts as a guide when the valve is being closed; and third, it provides an efficient locating and retaining means for receiving thereover a plastic sealing member 31, during assembly of the valve.

Referring now more specifically to FIG. 3, the annular retaining groove 26 is machined in the periphery of stem 12 at a point just above the venturi throat 14a and at the level corresponding to the valve seat 15. When the stem is in the extreme downward or closed position a side wall 28 of the retaining groove 26 is tapered upwardly to a substantially flat wall 30 and is provided at its lower end with a radial flange-like structure forming a cylindrical lower lip 27 between the conical shaped portion 25 and groove 26. Although the upper wall 30 may be flat it is preferably cut at a slight taper as shown. As seen from the description above and from the illustration in FIG. 3, the side walls of the groove 26 are frustro-conical with their axis coinciding with valve stem 12. The advantage of placing the retaining groove 26 in this angular position provide for an improved sealing relationship which will be described later.

Referring now specifically to FIGS. 4 and 5, a sealing ring or member is indicated generally by the numeral 31, and as illustrated in FIG. 5, is substantially quinquelateral in cross section and provides two sealing surfaces 32 and 33 disposed at an acute angle with respect to each other. The sealing member 31, in the preferred embodiment of this invention, is made from a resilient plastic material with the faces of the sealing surfaces 32 and 33 either slightly concave or convex as shown in dotted lines in FIG. 5. Either curvature will provide an effective seal. The upper sealing surface 32 of the sealing member engages the upper wall 30 of the groove 26 when the valve stem 12 is moved to the closed position. Likewise, the sealing surface 33 of the sealing member engages a mating surface 34 of the valve seat 15. The sealing member 31, formed from a suitable plastic material such as an acetal resin known as Delvin, a polyamide known as nylon, fluorocarbons known as Teflon or Kel–F, polycarbonate known as Lexan, vinyl-idenechloride polymers, known as Saran, to name a few, is resilient enough to slide over the retaining lip 27, into groove 26, and immediately return to its normal shape. As is readily seen from the figures, the sealing member 31 is so contoured generally as to fit the essential angular contours of the groove 26.

Still referring to FIG. 3 and to FIG. 1, a valve stem surface 12b, immediately above the groove 26, has a reduced diameter for maintaining a spaced relationship with a surface 15a of the valve seat 15 when the valve is in the closed position. Likewise, the outside diameter of lip 27 is reduced to maintain the same spaced relationship with the inner surface of the venturi throat 14a. For example, the diameters of the mating parts are machined so that the maximum tolerance build-up or clearance will be .001 of an inch between the surfaces 12b–15a, and 27–14a when the valve is in the extreme closed position. The controlled spaced relationship of these mating surfaces in conjunction with the annular groove 26 retains the swivel sealing member 31 and will not permit deformation or flow of the sealing member between these surfaces regardless of the axial force applied to the sealing member. It being understood that the volume of the sealing member 31 is substantially greater than that of the groove 26.

The sealing member 31 is moved into contact with the upper side wall 30 of the groove 26 and the surface 34 of the valve seat 15 by turning the handle 11 so that the valve stem moves inwardly. Seen in FIG. 1, the high pressure of the fluid at the inlet port of the valve provides a force which engages a back wall 35 of the sealing member 31 to force the sealing member upwardly and outwardly in conjunction with the force of the valve stem 12 as it moves in a downward direction to assure positive engagement of the two sealing surfaces with their corresponding mating surfaces.

A unique characteristic of the plastic materials used for the sealing member 31 is their ability to return to their molded form. This inherent ability to return to a molded form provides a method for assuring that the sealing member 31 will always be free to swivel on the valve stem 12 when the valve 9 is in the open or nearly open position. This feature of having the sealing member swiveling on the valve stem allows a presentation of a different portion of the sealing surfaces 32 and 33 to come into contact with their respective mating surfaces each time the valve is placed in a closed sealing position. This presentation of an entirely different surface each time the valve is closed will prevent the marring of the valve seat and the constant wearing of the sealing member in one area, thus increasing the life span of the valve.

It is also well known that a plastic material such as used in the sealing member 31 performs with metal as though it were lubricated and the frictional co-efficient between the sealing member 31 and a flat surface when engaged therewith will be very minute and will not act as a clamping action on the sealing member until the applied pressure is sufficient enough to overcome the reduced frictional co-efficient. This inherent structural advantage of the plastic material sealing member 31 combined with the proper dimensional tolerances of the groove 26 and the valve stem assures the swiveling action of the ring even though it is in partial contact with the mating sealing surface 34 of the valve seat 15.

Although resiliency and a low co-efficient of friction are desirable characteristics, a controlling feature for determining the type of plastic material to be used for the swivel ring seal is the fluid medium to be controlled by the valve. Therefore, since different plastic seal materials are to be used for different fluids, it is necessary to provide a suitable retaining groove and dimensional tolerances within the valve whereby the desired seal is attained regardless of the plastic material used without injury to the sealing member as an axial force is transmitted thereto by the valve stem when going to a closed position.

Since the metallic parts of the valve structure are machined to close tolerances, structural characteristics of the plastics must be compensated for by proper dimensioning of the seal ring. The smallest internal diameter of the seal must be capable of expansion to a sufficient diameter to slide over the lip 27, of the stem without exceeding the fracture point of the plastic ring. In situations where the desired plastic for the swivel ring will not expand sufficiently under pressure to slide over the lip 27, preheating of the ring, such as placing it in hot liquid, will ordinarily permit sufficient expansion for installation on the stem without permanent injury to the plastic, which of course, will return to its normal position upon cooling and further be forced to resume its molded form with the initial closings of the valve. Moreover, even though the form of this seal is reduced below its molded form by use, its recovery resiliency will assure the maintenance of its swivel characteristics on the valve stem.

As explained above, the dimensional relationship between the valve stem and the valve seat has been so designed that when the stem is in the extreme closed or downward seating position, regardless of the amount of force applied thereto, the seal is retained and cannot flow between the mating surfaces of the valve regardless of the characteristics of the plastic used for the seal.

The swivel ring seal, when assembled on the valve stem, is free to rotate about the stem in the open valve position and upon closing of the valve by the downward movement of the stem, rotary movement between the seal and the stem is still possible even though there is pivotal contact with the valve seat. This is possible because of the extreme low co-efficient of friction of the plastic material of the seal with a flat metallic surface. As the stem continues downward towards the closed valve position, a leak-proof seal is first formed between the valve seat surface 34 and the surface 33 of the swivel ring. As previously mentioned, the combined force of the fluid inlet pressure and the axial force of the stem forces these two surfaces into sealing contact. Likewise, when these two forces exceed the low co-efficient of friction between seal surface 32 and the wall 30, a leak-proof seal is formed. Moreover, not only has the independent swiveling action of the seal relative to the stem permitted the presentation of an entirely different sealing surface as the valve is repeatedly opened and closed, but it also permits a positive leak-proof seal to be effected without introducing into the seal an undesirable twisting action from the rotating stem.

It will be readily apparent to those skilled in the art that the present invention provides an improved and useful sealing means for control valves within the objects stated. The invention may be subject to numerous modifications well within the purview of the inventor, who only intends to be limited to a liberal interpretation of the specification and the appended claims.

What is claimed is:

1. A control valve comprising a housing, said housing having an inlet, outlet and relief ports integrally formed therein, a connecting passage between said inlet and outlet ports defining a venturi throat over a portion of a length thereof, a valve seat positioned within said passage, a rotatable valve stem, means for rotating the valve stem secured to the upper portion thereof, a conical shaped surface formed on the other end portion of said valve stem, an annular groove recessed in the lower portion of the valve stem adjacent to said conical surface, said groove having a retaining lip in juxtaposition with said conical surface, said groove having a side wall tapering inwardly, relative to the center line of the valve stem and an upper wall angling upwardly relative to a horizontal plane, and a flexible plastic sealing member, said sealing member swivelly disposed in said groove to present a substantially different surface area to engage the valve seat, said flexible plastic sealing member consists of a circular ring of resilient plastic of low co-efficient of friction which is substantially quinquelateral in cross section and has an upper contoured sealing surface which rotatably engages the upper wall of said groove in sealing relationship and a side contoured sealing surface which engages the valve seat and side wall of the groove to effect a leak-proof closure between the inlet and outlet ports when the valve is in an extreme closed position, stem surfaces above and below the groove maintaining a spaced relationship with the valve seat whereby said ring is retained from flow between the valve seat and said upper wall as an axial force is applied thereto whereby a perfect leak-proof seal is attained when the valve stem is in the extreme closed position.

2. A control valve comprising a housing, said housing having an inlet conduit opening into a valve chamber and an outlet port therefrom integrally formed therein, said inlet conduit having intermediate its ends a venturi passageway defining a portion adjacent to one end of the conduit tapering to a throat portion beyond which it enlarges into diverging walls defining a portion of a valve seat adjacent the other end portion of said conduit and opening into the valve chamber, a rotatable valve stem coaxial with said valve seat and said other end of said conduit, means for moving said valve stem in an axial direction upon rotation thereof, a conical end wall formed on the valve end of the valve stem, an angular groove recessed in the lower portion of the valve stem adjacent to said end wall, a flange-like retaining lip disposed between said end wall and said groove and marginally receivable in said throat with close clearance, said groove having a side wall tapering inwardly relative to the center line of the valve stem and an upper wall defining a substantially flat surface of revolution angled outwardly relative to the axis of the valve stem and terminating in a surface receivable in said other end of the conduit with close clearance, and a sealing member disposed in said groove, said sealing member being swivelly carried in said groove to present a substantially different surface area to engage the valve seat and comprising an integral, circular, resilient, plastic-like material which will deform to a limited extent and is cross-sectionally shaped to fit the essential angular angular contours of the groove and valve seat when the valve is in closed position including an upper contoured sealing surface mating in rotatable sealing relationship with the upper wall of said groove and a side contoured sealing surface which engages the valve seat frictionally to effect a leak-proof seal between the inlet conduit and outlet port when the valve stem is in closed position, said sealing member when the valve is closed being confined under bodily compression in said groove and when the valve is open said sealing member and said valve end of the valve stem co-operating with said valve seat to provide a venturi flow passage therebetween.

3. The combination called for in claim 2 in which said valve seat includes a portion of said other end portion of said conduit adjacent to said diverging wall portion.

4. A control valve comprising a housing, said housing having an inlet conduit defining a surface of revolution opening into a valve chamber and an outlet port therefrom integrally formed therein, said inlet conduit having intermediate its ends a venturi passageway defining a portion adjacent to one end of the conduit tapering to a throat beyond which it enlarges into diverging walls defining a portion of a valve seat adjacent the other end of said conduit opening into the valve chamber, a rotatable valve stem coaxial with said valve seat and other end of said conduit, means for moving said valve stem in an axial direction upon rotation tehreof, a conical shaped end wall formed on the valve end of the valve stem, an angular groove recessed in the lower portion of the valve stem adjacent to said end wall, a flange-like retaining lip between said end wall and said groove having a marginal surface receivable in said throat with close clearance, said groove having a side wall tapering inwardly relative to the center line of the valve stem and an upper wall defining a substatially flat surface of revolution angled outwardly relative to the axis of the valve stem and terminating in a surface receivable in said other end of the conduit with close clearance, and a sealing ring disposed in said groove, said sealing ring being swively carried in said groove and comprising an integral, circular, resilient, plastic-like material having a low co-efficient of friction which will deform to a limited extent, said sealing ring being cross-sectionally contoured to fit the essential angular contours of the groove and valve seat when the valve is in closed position and including an upper contoured sealing surface mating in rotatable sealing relationship with the upper wall of said groove and a side contoured sealing surface which engages the valve seat frictionally to effect a leak-proof seal between the inlet conduit and outlet port when the valve stem is in closed position, said surfaces on the valve stem on opposite sides of said groove retaining the material of said ring against flow in an axial direction as an axial force is applied to the ring when the valve stem is in extreme closed position, and said sealing member in combination with said valve end of the valve stem a venturi flow passage in cooperation with said valve seat when the valve is open.

5. A cnotrol valve comprising a housing, said housing having an inlet conduit defining a surface of revolution opening into a valve chamber and an outlet port therefrom integrally formed therein, said inlet conduit having intermediate its ends a venturi passageway defining a portion adjacent to one end of the conduit tapering to a throat beyond which it enlarges into diverging walls defining a portion of a valve seat adjacent the other end of said conduit opening into the valve chamber, said housing having a pressure relief means including a passage opening at substantially a right angle into said venturi passage adjacent to said throat, a rotatable valve stem coaxial with said valve seat and other end of said conduit, means for moving said valve stem in an axial direction upon rotation thereof, a conical shaped end wall formed on the valve end of the valve stem in close proximity to said pressure relief passage when the valve stem is in closed position, an angular groove recessed in the lower portion of the valve stem adjacent to said end wall, said groove having a flange-like retaining lip between said end wall and said groove marginally receivable in said throat with close clearance to maintain a predetermined spaced relationship with the portion of said throat when the valve stem is being closed, said groove having a frusto-conical side wall tapering inwardly relative to the center line of the valve stem and an upper wall defining a substantially flat surface of revolution angled outwardly relative to the axis of the valve stem and terminating in a surface receivable in said other end of the conduit with close clearance to maintain a predetermined spaced relationship with a portion of said other end of said conduit when the valve is closed, and a sealing member disposed in said groove, said sealing ring being swively carried in said groove and integrally formed of a resilient, plastic material having a low co-efficient of friction which will deform to a limited extent under compression, said sealing ring fitting the essential angular contours of the groove and valve seat when the valve is in closed position including an upper contoured sealing surface mating in rotatable sealing relationship with the upper wall of said groove and a side contoured sealing surface which engages the valve seat frictionally to effect a leak-proof seal between the inlet conduit and outlet port when the valve stem is in closed position, said sealing member engaging a portion of said other end of said conduit and being confined under bodily compression in said groove between said areas of predetermined spaced relationship when the valve is closed to prevent said plastic material from flowing, and said sealing member in combination with said valve end of the valve stem forming a venturi flow passage for fluid past said pressure relief passage in cooperation with said valve seat when the valve is open.

References Cited in the file of this patent

UNITED STATES PATENTS

| | | |
|---|---|---|
| 1,291,401 | Caven | Jan. 14, 1919 |
| 1,686,849 | Frauenheim | Oct. 9, 1928 |
| 1,781,224 | Gilz | Nov. 11, 1930 |
| 2,646,246 | Tucci | July 21, 1953 |
| 2,876,982 | Snider | Mar. 10, 1959 |
| 2,976,009 | Hartmann | Mar. 21, 1961 |
| 2,978,220 | Morsch | Apr. 4, 1961 |
| 3,085,783 | Pulling | Apr. 16, 1963 |

FOREIGN PATENTS

| | | |
|---|---|---|
| 71,885 | France | of 1959 |
| 1,214,285 | France | of 1959 |